US012735237B2

(12) United States Patent
Grimbacher et al.

(10) Patent No.: US 12,735,237 B2
(45) Date of Patent: Sep. 15, 2026

(54) COVER FILM FOR A BLISTER PACK, AND BLISTER PACK

(71) Applicant: SÜDPACK Medica AG, Baar (CH)

(72) Inventors: Carolin Grimbacher, Ochsenhausen (DE); Michael Hermann, Baden (CH)

(73) Assignee: SÜDPACK Medica AG, Baar (CH)

( * ) Notice: Subject to any disclaimer, the term of this patent is extended or adjusted under 35 U.S.C. 154(b) by 0 days.

(21) Appl. No.: 18/231,875

(22) Filed: Aug. 9, 2023

(65) Prior Publication Data

US 2024/0051723 A1 Feb. 15, 2024

(30) Foreign Application Priority Data

Aug. 10, 2022 (EP) .................................... 22189764

(51) Int. Cl.
*B65D 75/36* (2006.01)
*B32B 27/08* (2006.01)
(Continued)

(52) U.S. Cl.
CPC .............. *B65D 75/36* (2013.01); *B32B 27/08* (2013.01); *B32B 27/306* (2013.01); *B32B 27/325* (2013.01); *B65D 65/40* (2013.01); *B65D 65/42* (2013.01); *B32B 2250/246* (2013.01); *B32B 2255/10* (2013.01); *B32B 2255/26* (2013.01); *B32B 2307/31* (2013.01); *B32B 2307/7244* (2013.01); *B32B 2307/7246* (2013.01); *B32B 2307/7376* (2023.05); *B32B 2435/02* (2013.01); *B32B 2439/80* (2013.01); *B65D 2565/387* (2013.01)

(58) Field of Classification Search
CPC ........ B65D 75/36; B65D 65/40; B65D 65/42; B65D 2565/387; B32B 27/08; B32B 27/306; B32B 27/325; B32B 2307/7376; B32B 2250/246; B32B 2255/10; B32B 2255/26; B32B 2307/31; B32B 2307/7244; B32B 2307/7246; B32B 2435/02
USPC ........................ 206/524.1, 524.2, 484, 484.2
See application file for complete search history.

(56) References Cited

U.S. PATENT DOCUMENTS 11,684,131 B2 * 6/2023 Almond ............... B65D 75/366 206/5.1
11,752,742 B2 * 9/2023 Blyth ................. B65D 75/5838 383/203

(Continued)

FOREIGN PATENT DOCUMENTS

CH 701 216 12/2010
DE 196 13 960 10/1997

(Continued)

OTHER PUBLICATIONS

Third Party Observation dated Oct. 17, 2025 in European Application No. 20220189764, with English translation.

(Continued)

*Primary Examiner* — Jacob K Ackun
(74) *Attorney, Agent, or Firm* — Collard & Roe, P.C.

(57) ABSTRACT

A cover film (1) for sealing a base film (2) of a blister pack for drugs, comprising two outer layers, namely, a cover layer (3) and a sealing layer (4), and one or more intermediate layers (5) situated between the cover layer (3) and the sealing layer (4), characterized in that the cover layer (3) and the sealing layer (4) are polypropylene layers (6, 7, 10).

17 Claims, 2 Drawing Sheets

(51) Int. Cl.

| | |
|---|---|
| ***B32B 27/30*** | (2006.01) |
| ***B32B 27/32*** | (2006.01) |
| ***B65D 65/40*** | (2006.01) |
| ***B65D 65/42*** | (2006.01) |

(56) References Cited

U.S. PATENT DOCUMENTS

2009/0208729 A1 8/2009 Allegaert et al.
2010/0155288 A1* 6/2010 Harper .................... B32B 27/32 428/479.3
2011/0132794 A1* 6/2011 Ingraham ............. B65D 75/327 53/452
2012/0091149 A1* 4/2012 Pedmo ............... B65D 21/0219 206/509
2012/0128835 A1* 5/2012 Lyzenga ................... B65B 9/20 53/461
2013/0299373 A1* 11/2013 Johnson .................. B32B 27/18 428/339
2014/0197066 A1* 7/2014 Brandl .................... B65B 47/02 206/532
2014/0231296 A1* 8/2014 Reggio ................ B65D 75/585 206/484
2014/0346076 A1* 11/2014 Bookvich .......... B65D 75/5805 206/525
2015/0060458 A1* 3/2015 Bandou .............. B65D 77/2096 220/359.1
2015/0307260 A1* 10/2015 Reggio ............. B65D 83/0445 206/531
2015/0367614 A1* 12/2015 Sasaki ..................... B32B 27/32 428/522
2016/0122116 A1* 5/2016 Branyon ................ B65D 65/14 156/244.11
2019/0009963 A1 1/2019 Wessely

FOREIGN PATENT DOCUMENTS

| | | |
|---|---|---|
| DE | 10 2008 056 123 | 5/2010 |
| DE | 20 2021 002 835 | 9/2021 |
| EP | 0622098 | 11/1994 |
| EP | 0 757 703 B1 | 8/1999 |
| EP | 3 957 475 A1 | 2/2022 |
| JP | H11105217 | 4/1990 |
| JP | H05-178365 | 7/1993 |
| JP | 2004256125 | 9/2004 |
| JP | 200528679 | 2/2005 |
| JP | 2014068770 | 4/2014 |
| WO | WO 9529202 | 11/1995 |

OTHER PUBLICATIONS

Indian Office Action dated Jan. 9, 2026 in Indian Application No. 202334053613.

Wikipedia article excerpt, “Sphärolith” (Spherulite), 2022 [with English translation of highlighted sentences; see Third Party Observation dated Oct. 17, 2025 in European Application No. 20220189764, with English translation, for relevance].

* cited by examiner

COVER FILM FOR A BLISTER PACK, AND BLISTER PACK

REFERENCE TO PENDING PRIOR PATENT APPLICATION

This patent application claims benefit of European Patent Application No. 22 189 764.8, filed Aug. 10, 2022, which patent application is hereby incorporated herein by reference.

FIELD OF THE INVENTION

The invention relates to a cover film, and a blister pack comprising two outer layers, namely, a cover layer and a sealing layer, and one or more intermediate layers situated between the cover layer and the sealing layer. The invention further relates to a blister pack.

BACKGROUND OF THE INVENTION

In particular for high-quality drugs, packagings are used that are intended to securely protect the drug from environmental influences, in particular oxygen and moisture. This is the only way to maintain the intended effect of the active substance or the ingredients of the drug when ingested. Therefore, for drugs in tablet form, so-called blister packs are often used. Blister packs are usually made up of a so-called press-through blister, also referred to as a base part or base film, which represents a molded part with depressions or cavities and which is generally made of plastic, but which may also be manufactured from aluminum, and a cover film, also referred to as a blister film, that can usually be pushed through and that is also made predominantly of aluminum, so that a drug may be pressed out of the cavity in the base film and through the cover film by a person. The basic advantage of the blister packs is the ease of use, the compact dimensions of the packaging, and the accompanying easy portability of the particular drug, while at the same time protecting it from any environmental influences.

The use of aluminum serves primarily to seal off the drug from water and oxygen, since aluminum has a high water vapor barrier and oxygen barrier, and at the same time, depending on the foil strength or thickness, may be pressed, with the particular drug in the cavity of the base film, out of the blister pack and through the cover film relatively easily by the user. However, aluminum as a material is energy- and resource-intensive, and despite the fact that aluminum is recyclable, it still entails high energy requirements.

Therefore, different approaches are known from the prior art to reduce or completely remove aluminum in the blister pack, and to thereby provide the same material properties offered by aluminum.

For example, a blister pack is previously known from DE 10 2008 056 123 A1, comprising a multilayer film made exclusively of different plastic or polymer layers, as the result of which aluminum may be dispensed with entirely. This is in particular a deep-drawable multilayer film having low water vapor and oxygen permeability, and which is suitable for blister packs for drugs and preferably has a layered composite of the PVC/PVDC/PCTFE/PVC type.

Furthermore, US 2009/0208729 A1 discloses a film structure, characterized in that it comprises at least five layers. These include two outer layers made of a polyolefin on which a layer forming a gas barrier is provided in each case on the opposite sides, with a layer made of a foamed plastic provided between the two above-mentioned gas barriers. Both outer layers are made up of a mixture of a polyolefin and a binder, which makes it possible to bond this polyolefin layer to the layer that forms the gas barrier.

US 2019/0009963 A1 discloses a plastic film molded part for a blister, in particular a tablet blister, comprising a transparent carrier substrate having a semitransparent functional layer. The semitransparent functional layer is constituted in such a way that the plastic film molded part has a first, visually recognizable color upon viewing in incident light and has a second, visually recognizable color upon viewing in transmitted light.

In addition, a polyolefin blister pack previously known from German Utility Model DE 20 2021 002 835 U1, having one or more depressions, produced by thermoforming, for accommodating the good to be packaged, and made up of a cover film that is bonded to the base film. The blister pack is characterized in that the base film and the cover film are made essentially of polyolefin, and at least 50 wt-% of the cover film is made of cycloolefin polymer.

Moreover, a method is previously known from Swiss Patent application CH 701 216 A1 for manufacturing a cover film for press-through packagings. In this method, the cover film is irradiated with electrons in order to set a desired press-through capability.

SUMMARY OF THE INVENTION

Proceeding from this prior art, the object of the invention described here is to provide a blister pack, a cover film, and a base film, in which aluminum may be dispensed with in each case, and with which the requirements of high-value drugs for a high water barrier and oxygen barrier are met in a cost-effective manner This object is achieved using a cover film according to one aspect of the invention. Moreover, this object is achieved by a blister pack according to another aspect of the invention. Advantageous embodiments are discussed below

.

In a first aspect of the invention, this involves a cover film for sealing a base film of a blister pack for drugs, comprising two outer layers, namely, a cover layer and a sealing layer. The cover film itself thus represents a multilayer film in which the cover layer is the side of the cover film that faces the outside or the surroundings. The sealing layer is the side of the cover film that faces the drug within a cavity typically present in the base film. One or more intermediate layers are situated between these outer layers, i.e., the cover layer and the sealing layer.

The invention is characterized in that the cover layer and the sealing layer are made of polypropylene, i.e., are polypropylene layers. Polypropylene has a favorability comparable to polyvinyl chloride, which is often used in blister packs or cover parts and base parts of blister packs, but with a basically higher water vapor barrier.

To reduce the brittleness and the effort associated with pressing the particular drug out of a base part and through the cover film, in one advantageous embodiment for the cover film the invention provides that the one or more intermediate layers between the two outer layers are copolymer layers, preferably heterophasic copolymer layers. This is particularly preferably a heterophasic polypropylene copolymer layer. Heterophasic copolymer layers, also referred to as block copolymers, include a polymer matrix with a dispersed rubber-like copolymer phase. The matrix is a homopolymer or a statistical copolymer matrix. The rubber-like copolymer phase is a mixture of an amorphous rubber, a rubber-like polymer, which for heterophasic polypropylene copolymers is normally an ethylene/propylene copolymer (rubber), and a semicrystalline copolymer.

The at least one copolymer layer of the one or more intermediate layers preferably has a layer thickness of 20 to 260 μm, particularly preferably a layer thickness of 100 to 180 μm. With such a layer thickness the cover film always remains compact, and at the same time the mechanical properties are improved, namely, the capability of a user to press through a drug in the form of a tablet.

Alternatively or additionally, in a further advantageous embodiment for the cover film, the invention provides that the one or more intermediate layers include at least one talc-reinforced polypropylene layer. A talc-reinforced polypropylene is, for example, a composition of polypropylene and talc, the portion of the talc usually varying in a range of 20 to 35%. The talc-reinforced polypropylene is characterized by a fairly high heat resistance and load capacity, and improved rigidity compared to pure polypropylene. However, the latter property results in the plastic also being more susceptible to breakage. However, precisely this property is desired here in order to achieve easier press-through capability of the cover film, depending on the layer thickness of the talc-reinforced polypropylene layer.

Moreover, in a further advantageous embodiment for the cover film, the invention provides that the one or more intermediate layers include at least one cycloolefin layer, preferably a cycloolefin copolymer layer. The presence of a cycloolefin layer results in a considerable improvement of the water vapor barrier, it being possible to vary the height of the water vapor barrier simply via the layer thickness of the cycloolefin layer, which may be in a range of 20 to 260 μm, preferably in a range of 80 to 100 μm, and particularly preferably 80 μm. The latter layer thickness is the optimal compromise between an improved water vapor barrier and the also desired press-through capability of the cover film.

However, to also be able to meet the requirements of some drugs for a high oxygen barrier, in a further advantageous embodiment for the cover film the invention provides that the one or more intermediate layers include at least one polyvinyl alcohol layer, preferably an ethylene-vinyl alcohol copolymer layer. Due to the hydrogen bridge bonds present between the individual polymer chains within a polyvinyl alcohol, and in conjunction with the crystalline structure, polyvinyl alcohol is one of the best available barriers against oxygen. The polyvinyl alcohol layer preferably has a layer thickness of 5 to 15 μm.

Depending on the desired properties of the cover film, in a further advantageous embodiment the invention provides different materials for the outer layers, i.e., the cover layer and the sealing layer.

In a first alternative embodiment, the cover layer and/or the sealing layer are/is made of a polypropylene homopolymer layer. A polypropylene homopolymer, compared to atactic polypropylene, is characterized by an increasing degree of crystallinity, melting point, tensile strength, rigidity, and hardness due to the isotactic orientation of the moieties, in the present case the methylene groups. High isotacticity ultimately results in increased brittleness, which in turn is advantageous for improving the press-through capability of the cover film. The polypropylene homopolymer layer preferably has a layer thickness of 10 to 140 μm, particularly preferably 60 to 110 μm.

In a further alternative embodiment, the cover layer and/or the sealing layer are/is made of a polypropylene copolymer layer. A distinction may be made between a polypropylene block copolymer and a polypropylene random copolymer. For the polypropylene block copolymer, the copolymer monomer is built up into the polymer chain block by block, whereas for the polypropylene random copolymer, it occurs in the molecular chain with a random distribution. In particular, due to the different lengths and numbers of copolymer blocks or the particular block copolymer monomer used, the properties of the polypropylene copolymer to be obtained in each case may be influenced. In particular, its toughness behavior and rigidity may be influenced. Lastly, the brittleness or toughness of the cover film may in turn be influenced by use of a polypropylene copolymer layer.

In a further alternative embodiment, the cover layer and/or the sealing layer are/is made of a nucleated polypropylene homopolymer layer. Nucleation or seed formation may be utilized to facilitate the formation of crystalline areas for atactic polypropylene. This is because the mechanical properties of a polypropylene may be influenced by the size and type of crystal structures that are present. Since not all areas of a polypropylene chain are isotactic or syndiotactic, it is not possible to incorporate all areas of a polymer chain into a crystallite. The isotactic areas of a polypropylene homopolymer generally crystallize in the form of $\alpha$-spherulite. However, by adding suitable or specialized nucleating agents, $\beta$-spherulite may be formed, which is accompanied by an increased impact strength of the polypropylene thus obtained. Depending on the desired properties and field of application, it may thus be advantageous to use nucleated polypropylene homopolymer containing $\alpha$-spherulite or $\beta$-spherulite for the cover layer and/or the sealing layer of a cover film. The nucleated polypropylene homopolymer layer particularly preferably has a layer thickness of 120 to 200 μm.

For further improvement of the water vapor barrier and oxygen barrier, in a further advantageous embodiment for the sealing layer the invention provides that a sealing lacquer is applied to the sealing layer. This lacquer serves to further reinforce the water vapor barrier or oxygen barrier without an excessive adverse impact on the desired properties at the cover film, in particular the brittleness for the press-through capability of any drugs through the cover film.

For child-proofing any blister packs for drugs, in the prior art it is common to increase the layer thickness of the aluminum foil or to design the blister pack in such a way that the cover film cannot be pushed through, but instead can only be pulled off with an effort that is not exertable by a small child. To likewise allow provision of child-proofing of the blister pack described here, in a further advantageous embodiment the invention provides that the blister pack has a barrier coating on the cover layer of the cover film, preferably a removable barrier coating. The coating is particularly preferably a biaxially oriented polypropylene layer. Biaxially oriented polypropylene acquires its special properties due to a special stretching process, in which it is initially stretched in a roller direction and then stretched orthogonally with respect to the roller direction and subsequently fixed, it being characterized in particular by its high tensile strength and chemical, mechanical, and thermal stability, as well as transparency. Therefore, biaxially oriented polypropylene is optimally suited for securing any packs for drugs from undesired opening by children, since when it is applied to a cover film, the cover film can no longer be pulled from the base part of the blister pack without an appropriate exertion of force.

In a second and final aspect, the invention relates to a blister pack for drugs, which includes a cover film according to the invention.

The invention is explained in greater detail below with reference to several exemplary embodiments.

DETAILED DESCRIPTION OF THE PREFERRED EMBODIMENTS

Figure 1:
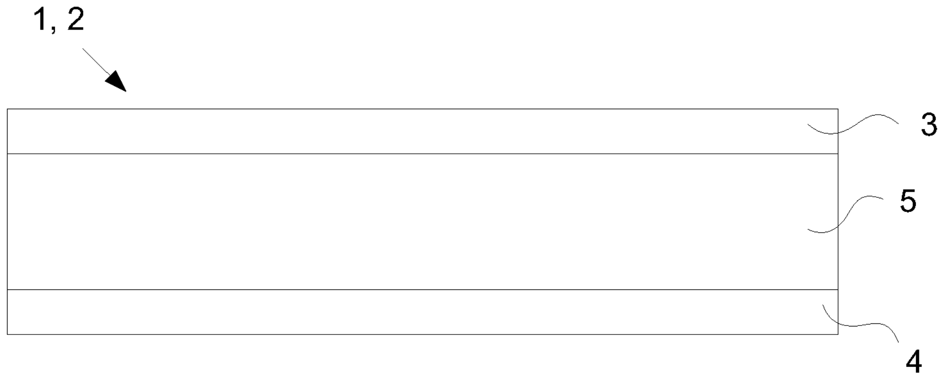
FIG. 1: shows a schematic illustration of a multilayer film according to the invention.

FIG. 1 shows a schematic illustration of a multilayer film according to the invention. The cover film 1 and the base film 2 are each made up of two outer layers, namely, a cover layer 3 and a sealing layer 4. The cover layer 3 is the side of the cover film 1 that faces the outside or the surroundings. In contrast, the sealing layer 4 is the side of the cover film 1 that faces the drug within a cavity that is typically present in the base film 2. One or more intermediate layers 5 are situated between these outer layers, i.e., the cover layer 3 and the sealing layer 4.

Figure 2:
FIG. 2: shows a first exemplary embodiment of the multilayer cover film according to the invention.

FIG. 2 shows a first exemplary embodiment of the cover film 1 according to the invention. This cover film comprises two outer layers and one intermediate layer 5, the cover layer 3 and the sealing layer 4 being polypropylene homopolymer layers 6, and the intermediate layer 5 being a copolymer layer 7, in particular a heterophasic random copolymer layer. This cover film is suited for drugs that are less sensitive to water and oxygen, and is easy to press through due to the intermediate layer 5, which is much larger compared to the outer layers, since the intermediate layer 5 made of heterophasic random copolymer 7, compared to the polypropylene homopolymer layers 6, has greater brittleness or rigidity and thus less elasticity.

Figure 3:
FIG. 3: shows a second exemplary embodiment of the multilayer cover film according to the invention.

FIG. 3 shows a cover film 1 according to the invention that is also suitable for water-sensitive drugs. Between the two polypropylene homopolymer layers 6 as a cover layer 3 and a sealing layer 4, this cover film has a cycloolefin layer 8 as an intermediate layer 5.

Figure 4:
FIG. 4: shows a third exemplary embodiment of the multilayer cover film according to the invention.

To allow protection to be provided against both water and oxygen, in addition a corresponding cover film is shown in FIG. 4. This cover film likewise includes a polypropylene homopolymer layer 6 in each case as a cover layer 3 and a sealing layer 4, and a total of three intermediate layers 5. The first two intermediate layers 5, which directly adjoin the outer layers, i.e., the cover layer 3 and the sealing layer 4, are a cycloolefin layer 8 in each case. Lastly, situated between the two cycloolefin layers 8 is a polyvinyl alcohol layer 9, which due to its material properties has a high oxygen affinity. The cover film 1 shown here in FIG. 4 thus has a high water vapor barrier and oxygen barrier.

Figure 5:
FIG. 5: shows a fourth exemplary embodiment of the multilayer cover film according to the invention.

Lastly, FIG. 5 shows a cover film 1 according to the invention in which the two outer layers, i.e., the cover layer 3 and the sealing layer 4, are nucleated polypropylene homopolymer layers 10, and the cover film has three intermediate layers 5. Here as well, the two outer layers are adjoined in each case by a cycloolefin layer 8, both of which enclose a heterophasic random copolymer layer 7.

Thus, a cover film for a blister pack as well as a blister pack for drugs are described above, by means of which aluminum may be dispensed with in the film, and the requirements for a high water vapor barrier and oxygen barrier may be met in a cost-effective manner.

LIST OF REFERENCE NUMBERS

1 cover film
2 base film
3 cover layer
4 sealing layer
5 intermediate layer
6 polypropylene homopolymer layer
7 copolymer layer
8 cycloolefin layer
9 polyvinyl alcohol layer
10 nucleated polypropylene homopolymer layer

What is claimed is:

1. A cover film (1) for sealing a base film (2) of a blister pack for drugs, the cover film comprising:
- two outer layers, namely, a cover layer (3) and a sealing layer (4); and
- one or more intermediate layers (5) situated between the cover layer (3) and the sealing layer (4);
- wherein the cover layer (3) and the sealing layer (4) are nucleated polypropylene homopolymer layers (10); and
- wherein the one or more intermediate layers (5) comprise at least one layer selected from the group consisting of:
  - a cyclo-olefin layer (8); and
  - a polyvinyl alcohol layer (9).

2. The cover film according to claim 1, wherein the one or more intermediate layers (5) comprises at least one cyclo-olefin layer (8).

3. The cover film according to claim 2, wherein the at least one cyclo-olefin layer (8) has a layer thickness of 80 to 100 μm.

4. The cover film according to claim 1, wherein the one or more intermediate layers comprises at least one polyvinyl alcohol layer (9).

5. The cover film according to claim 4, wherein the at least one polyvinyl alcohol layer (9) has a layer thickness of 5 to 15 μm.

6. The cover film according to claim 1, wherein the one or more intermediate layers (5) comprises at least two cyclo-olefin layers (8) between which a polyvinyl alcohol layer (9) is arranged.

7. The cover film according to claim 1, wherein the nucleated polypropylene homopolymer layers (10) have a layer thickness of 120 to 200 μm.

8. The cover film according to claim 1, wherein a sealing lacquer is applied to the sealing layer (4).

9. The cover film according to claim 1, wherein the cover layer (3) comprises a peelable barrier coating.

10. The cover film according to claim 9, wherein the barrier coating is a biaxially oriented polypropylene layer.

11. The cover film according to claim 1, the one or more intermediate layers (5) at least one polypropylene copolymer layer.

12. The cover film according to claim 1, wherein the cyclo-olefin layer (8) comprises a cyclo-olefin copolymer layer.

13. The cover film according to claim 1, wherein the polyvinyl alcohol layer (9) comprises a ethylene-vinyl alcohol copolymer layer.

14. The cover film according to claim 1, wherein the cover layer (3) has a removable barrier coating.

15. The cover film according to claim 14, wherein the barrier coating is a biaxially oriented polypropylene layer.

16. A cover film (1) for sealing a base film (2) of a blister pack for drugs, the cover film comprising:

two outer layers, namely, a cover layer (3) and a sealing layer (4); and one or more intermediate layers (5) situated between the cover layer (3) and the sealing layer (4);

wherein the cover layer (3) and the sealing layer (4) are nucleated polypropylene homopolymer layers (10); and wherein the nucleated polypropylene homopolymer layers (10) have a layer thickness of 120 to 200 μm.

17. A cover film (1) for sealing a base film (2) of a blister pack for drugs, the cover film comprising:

two outer layers, namely, a cover layer (3) and a sealing layer (4); and one or more intermediate layers (5) situated between the cover layer (3) and the sealing layer (4);

wherein the cover layer (3) and the sealing layer (4) are polypropylene layers (6, 7, 10); and wherein the cover layer (3) has a removable barrier coating comprising a biaxially oriented polypropylene layer.

* * * * *